Nov. 1, 1927.　1,647,720
W. H. WAKEFIELD
ELECTRICAL WEFT DETECTOR CONTROLLED BY BOX MOTION
Filed Jan. 2, 1925　2 Sheets-Sheet 1
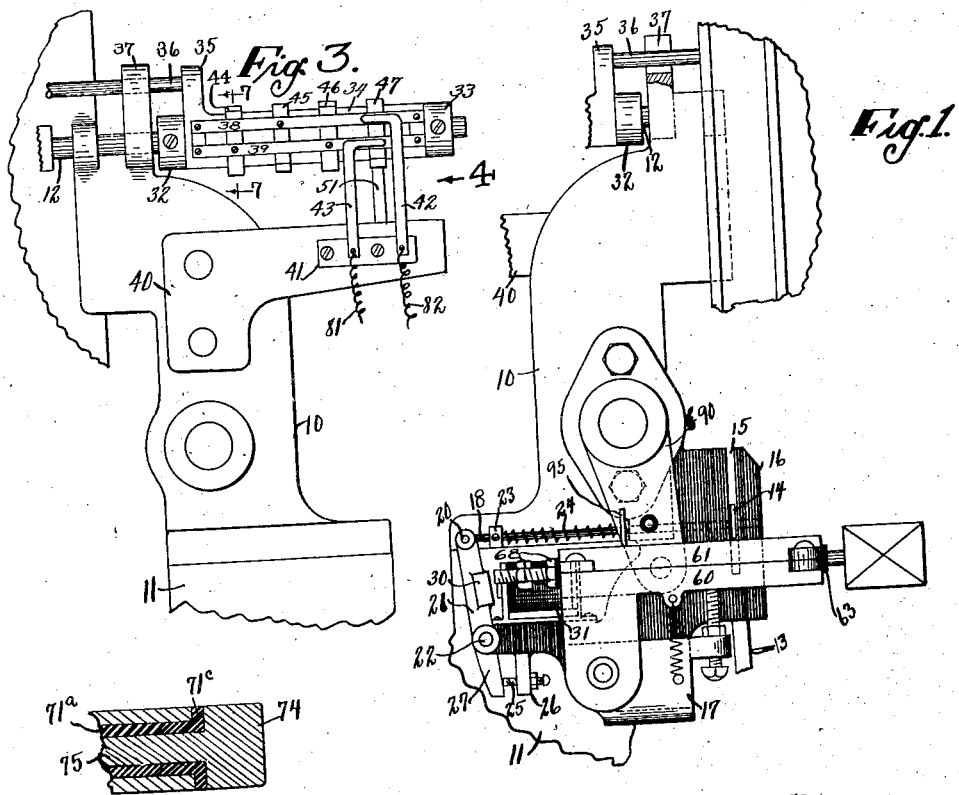
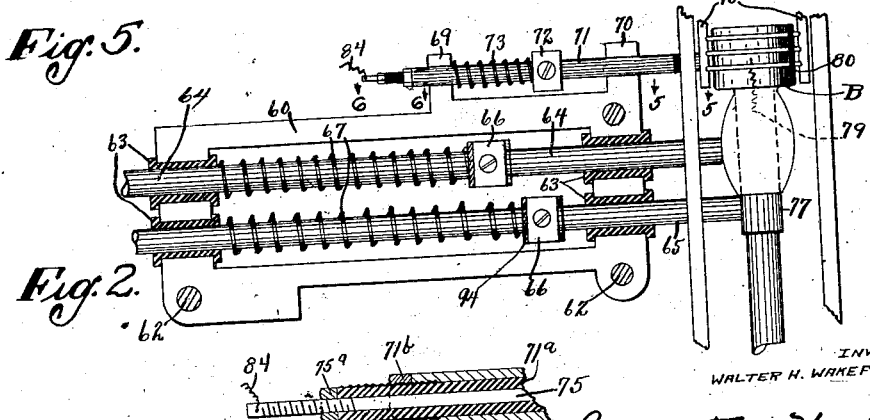
INVENTOR:
WALTER H. WAKEFIELD Nov. 1, 1927.  
W. H. WAKEFIELD  
1,647,720  
ELECTRICAL WEFT DETECTOR CONTROLLED BY BOX MOTION  
Filed Jan. 2, 1925   2 Sheets-Sheet 2
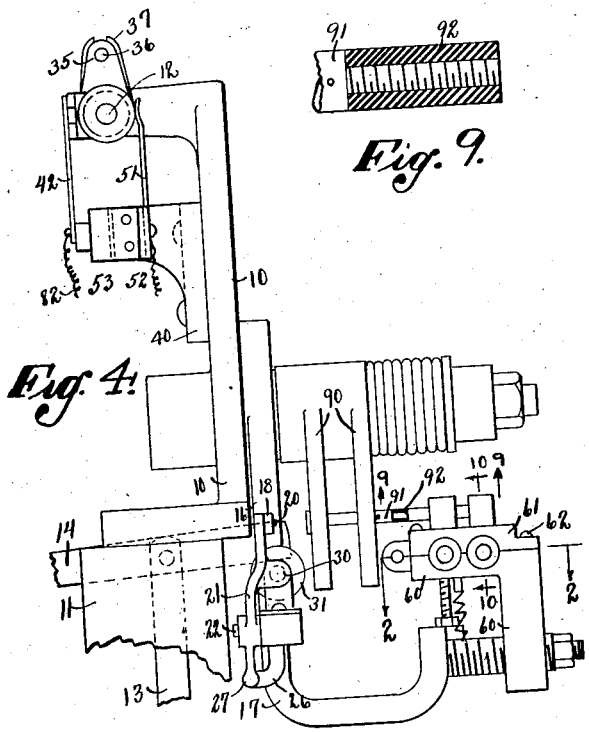
Fig. 4.
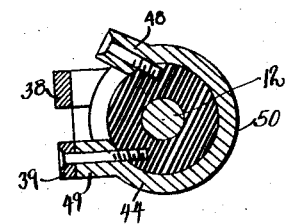
Fig. 9.
Fig. 7.
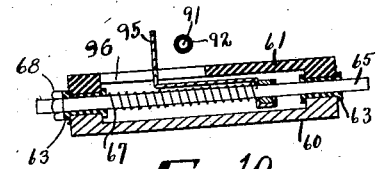
Fig. 10.
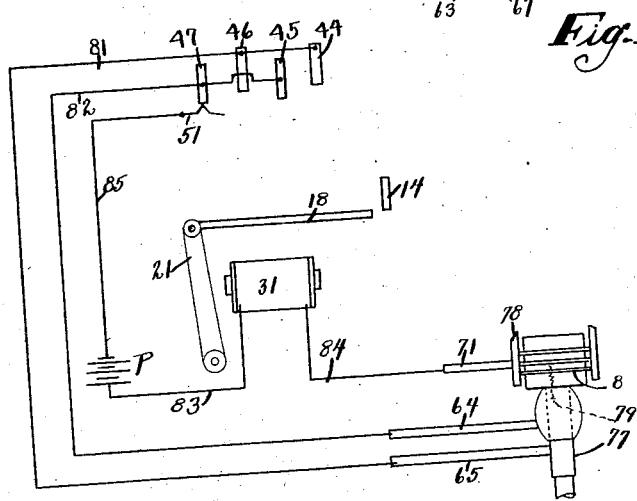
Fig. 8.
INVENTOR:—
WALTER H. WAKEFIELD
ATTORNEYS.

Patented Nov. 1, 1927.

1,647,720

UNITED STATES PATENT OFFICE.

WALTER H. WAKEFIELD, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS.

ELECTRICAL WEFT DETECTOR CONTROLLED BY BOX MOTION.

Application filed January 2, 1925. Serial No. 27.

This invention relates to improvements in weft detectors for box looms employing a plurality of shuttles and it is the general object of the invention to provide an electrical detector employing two or more electrical circuits each of which is arranged to be closed by a contact member carried by the shuttle.

It is a further object of the invention to provide an electrical detector with a plurality of contacts to enter the shuttle and detect for the absence of yarn, one of said detectors being arranged to give an indication when a relatively large amount of coarse yarn is present and another of the detectors giving an indication when a lesser amount of fine yarn is present, the detector for coarse yarn being automatically disconnected when a shuttle carrying fine yarn is sufficiently depleted to uncover that portion of the shuttle contact therein opposite the detector for coarse yarn.

The invention is applicable to that type of loom wherein one or more shuttles carry very fine yarn and wherein other shuttles carry relatively coarse yarn. In such looms a setting which would be proper for coarse yarn would be improper for the fine yarn, and vice versa.

With these and other objects in view which will appear as the description proceeds, my invention resides in the combination and arrangement of parts hereinafter described and set forth in the claims.

In the accompanying drawings, wherein I have shown a convenient embodiment of my invention, Fig. 1 is an end elevation of a portion of a loom having my invention applied thereto, the detector being shown in conjunction with a part of the usual type of multi-color replenishing mechanism, Fig. 2 is an enlarged horizontal section on line 2—2 of Fig. 4, Fig. 3 is a side elevation of the contact members as seen from the interior of the loom, Fig. 4 is a front elevation looking in the direction of arrow 4, Fig. 3, Fig. 5 is a fragmentary enlarged vertical section on line 5—5 of Fig. 2 showing the internal construction of the contact member which has electrical contact with some portion of the shuttle, Fig. 6 is an enlarged vertical section on line 6—6 of Fig. 2, Fig. 7 is an enlarged section on line 7—7 of Fig. 3, Fig. 8 is a diagrammatic view showing the lay-out of the electrical circuits, Fig. 9 is an enlarged vertical section on line 9—9 of Fig. 4, and Fig. 10 is an enlarged detail section on line 10—10 of Fig. 4.

In carrying out my invention I preferably associate the same with that type of replenishing mechanism shown in Patent No. 1,030,748. The mechanism for replenishing the bobbin comprises a frame 10 mounted conveniently upon loom side 11 and has a color slide 12 mounted for angular and longitudinal movement, the longitudinal movement being imparted by mechanism connected with the boxes or pattern mechanism and the angular movement being imparted by means of a reciprocating rod 13. Said rod has pivoted on the upper end thereof a floating lever 14 one end of which extends into a slot 15 formed in an upstanding horn 16 of a detector frame 17. The other end of said lever is connected by mechanism not shown to the color slide 12 to cause the same to receive an angular movement at indication of weft exhaustion for the purpose of advancing a bobbin of the proper color toward transfer position.

A controller pin 18 passes through the horn 16 and normally lies in front of the slot 15 to permit the lever 14 to descend without interruption. The controller is pivoted at the forward end thereof as at 20 to the upper end of a pivotally mounted arm 21 which is fulcrumed on a stud 22. A collar 23 adjustably set on the controller 18 receives the forward thrust of a compression spring 24 interposed between said collar and the horn 16 and tending to hold said controller pin out of the slot 15. A screw 25 secured adjustably in arm 26 depending from the feeler stand 17 engages the lower end 27 of arm 21 to limit forward movement of the controller pin and arm 21. The matter thus far described may be of the usual construction and forms no part of my present invention.

In carrying out my invention I provide an armature 30 for the arm 21 and mount an electro-magnet 31 on the detector frame 17, the magnet being so placed as to attract the armature 30 and move the controller pin 18 under the lever 14 against the action of spring 24. The electro-magnet is arranged to be in a plurality of circuits only one of which is closed at a time and said circuits are selected by mechanism associated with the color slide and are closed by contacts extending into the active shuttle to cooperate with a contacting member therein.

By referring to Fig. 3 it will be seen that I have extended the color slide 12 and have provided the same with a pair of collars 32 and 33, respectively, fastened to the slide to position a circuit making unit 34. Said unit is loosely mounted on the color slide between the collars and has upstanding therefrom a finger 35 from which projects a rod 36 extending substantially parallel to the color slide 12 and passing through the projection 37 rising from the magazine frame 10. Said pin 36 is rigid with respect to the circuit making unit and prevents the latter from oscillating when the color slide receives its angular movement during the operation of the replenishing mechanism. The body of the unit is of insulating material and has secured thereto contact bars 38 and 39, respectively, said bars being secured to the unit and moving therewith longitudinally. An auxiliary stand 40 secured to the frame 10 is provided with an insulating block 41 which supports contact brushes 42 and 43, respectively, which cooperate with the contact bars.

Adjustably secured to the circuit making unit 34 are open rings 44, 45, 46, and 47, respectively, said rings being substantially as shown in Fig. 7 and each comprising a pair of spaced heads 48 and 49, respectively, the outer surfaces of which are substantially the same distance from the axis of the unit 34 and extend beyond the intervening lower contact portions 50. The distance between the heads 48 and 49 is greater than the distance between the bars 38 and 39 so that but one head of each ring can be connected to a bar. As shown in Fig. 3 rings 44 and 46 are connected to bar 39 and rings 45 and 47 are connected to bar 38. That side of the rings opposite the heads is adapted for contact with a fixed contact 51 which may be formed of spring material and secured to an insulating block 52 carried on a projection 53 extending laterally from the auxiliary frame 40. The contact spring 51 is in fixed position and is arranged to contact with one or another of the rings depending upon the position of the color slide and as shown in Fig. 3 is positioned for contact with ring 47.

The device for closing the circuit is shown in Figs. 1 and 2 and comprises a supporting stand 60 mounted in any convenient manner on the detector stand 17 and having a cap 61 formed of fibre and held thereto by screws 62. Insulating bushings 63 are clamped between the stand 60 and cap 61 to afford sliding bearings for detector rods 64 and 65, respectively. A collar 66 is adjustably set on each rod to receive the rearward thrust of spring 67 which acts against the bushing 63 to hold the corresponding rod normally in rear position. In order to limit said rods screws 68 are threaded to the forward ends thereof to engage the forward bushings.

Extending laterally from said frame 60 are a pair of spaced ears 69 and 70 through which passes a contact rod 71 on which is mounted a collar 72. A spring 73 passing between the arm 69 and collar 72 holds the contact rod rearwardly. As shown in Fig. 5 said contact rod has a rear contact tip 74 formed on the end of pin 75 which extends through a sleeve $71^a$ of insulating material and has threaded thereon a nut $71^b$ to hold the shoulder $71^c$ against the rod 71. The pin 75 has a nut $75^a$ threaded thereon and in engagement with the forward end of sleeve $71^a$. In this way the contact 74 is insulated from the support therefor.

The detector is adapted for use with bobbins having a metallic ferrule 77 and provided with the usual bobbin holding springs 78. The bobbin B is provided with an electrical connection 79 passing from the metallic ferrule 77 to one of the rings 80 so that when the shuttle is in forward position the ferrule is in electrical contact with the pin 75.

The brushes 42 and 43 are connected with current conducting wires 81 and 82, respectively. Referring to Fig. 8 it will be seen that battery P is connected as by wire 83 to one side of the magnet 31 and the other side of said magnet is connected as by wire 84 to the pin 75. Wire 81 is connected to detector rod 65 and wire 82 is connected to detector 64.

It will be understood that the detector 65 contacts with the ferrule nearer the tip of the bobbin than does rod 64. Detector 65 is arranged to detect for coarse yarn and detector 64 cooperates similarly with fine yarn. When sufficient yarn has been drawn from the bobbin carrying coarse yarn the ferrule will be uncovered to permit the detector 65 to come into electrical contact therewith at which time the following devices will be electrically connected: battery P, wire 83, electromagnet 31, wire 84, contact bar 71, spring 78, wire 79, ferrule 77, detector 65, wire 81, and rings 44 and 46. It is to be understood that the color slide 12 moves the rings in timed relation with the active shuttle and the position of the rings is such that they will be connected to the proper contact bar. The contacting unit 34 will therefore be in such a position that one or the other of the rings 44 or 46 (corresponding to coarse yarn) will be in contact with spring contact 51 so that the devices previously indicated as electrically connected will be in circuit with brush 51 and wire 85 which is connected to battery P. This will energize the electro-magnet 31 to move arm 21 to give an indication of weft exhaustion as already described.

When a bobbin carrying fine yarn has had sufficient yarn drawn therefrom to uncover that portion of the ferrule opposite the bar 65 these two members will come into electrical contact but the circuit making unit 34 will be in such longitudinal position as to interrupt the circuit previously traced, but when the fine yarn is sufficiently exhausted to permit contact between detector 64 and the ferrule 77 the following circuit will be completed: Battery P, wire 83, electro-magnet 31, wire 84, contact rod 71, ferrule 77, detector 64, wire 82, ring 45 or 47 depending upon the position of the color slide (ring 47 being shown in position to close the circuit in Fig. 8) spring contact 51, and wire 85, back to the battery P. This circuit will energize the magnet 31 to give an indication of weft exhaustion.

Thus it will be seen that even though detector 65 is in electrical contact with the ferrule 77 the circuit will not be closed unless the proper shuttle is active to give the circuit making unit 34 such a position as will close the circuit through detector 65.

In order to withdraw the detectors at the time of transfer, there is provided the device shown in Figs. 1, 2, 4, and 10. The transferrer arm 90 carries a stud 91 on the right hand end of which as viewed in Fig. 4 is threaded an insulated bushing 92. Attached to each detector 64 and 65 is an angle clip 93 having a U-shaped portion 94 which encloses the collar on the detector. As shown in Fig. 10 the clip extends forwardly and has an upturned end 95 positioned for engagement with the insulated bushing 92. At the time of transfer the stud 91 is moved forwardly in a well known manner and the ends 95 are engaged thereby to be drawn forwardly thus moving the detectors away from the bobbin. Slots 96 in cap 61 one of which is shown in Fig. 10, position the clips to hold them against angular movement. Cap 61, being of insulating material such as fibre, prevents electrical contact between the clips. From this construction it will be seen that the detectors 64 and 65 are at all times insulated from the supporting structure and the withdrawing means.

From the foregoing it will be seen that I have provided an electrical detector involving a plurality of circuits which are closed by contact members carried by the shuttle and selected by mechanism operating in timed relation with the active shuttle in such a way that although a shuttle carrying fine yarn can establish electrical contact between the ferrule thereof and one of the detectors a circuit will not be closed unless the contact occurs in the proper shuttle. It will further be noted that the open rings are of such a construction that they can be moved angularly with respect to the unit so that said rings may be brought into contact either with bar 38 or 39 but not in contact with both of said bars.

Having thus described my invention it will be apparent that changes and modifications may be made therein by those skilled in the art without departing from the spirit and scope of the invention and I do not wish to be limited to the details herein disclosed, but what I claim is:

1. In a loom having a plurality of shuttles each of which may become active and each of which is provided with an electric circuit closing element, a member movable to assume a different position for each shuttle that becomes active, a plurality of electrical detectors positioned to enter the shuttle, a different detector being provided for each different kind of shuttle, a normally open circuit for each detector, means common to all the circuits to initiate a change in the operation of the loom, and means moving with the member to close the circuit corresponding to the active shuttle when the circuit closing element thereon is uncovered.

2. In a loom having a plurality of shuttles each of which may become active and each of which is provided with a circuit closing element, a member movable to assume a different position for each shuttle that becomes active, a plurality of detectors spaced apart in the direction of the length of the shuttle, a different detector being provided for each different kind of shuttle, an electric circuit for each detector, means common to all the circuits to initiate a change in the operation of the loom, and means moving with the member to disconnect all but one of said detectors from the first named means.

3. In a loom having a plurality of shuttle boxes and shuttles each of which may be moved to active position, an electrically operated controller device, a plurality of electric circuits each of which may be connected to the controller device, a plurality of detectors one for each circuit to enter the shuttle, means moving in timed relation with the shuttle boxes and dependent for its position upon which shuttle box is in active position, said means when moving in timed relation with the shuttle boxes disconnecting all of said detectors from the controller device except one, and means to initiate a change in the operation of the loom when any one of said circuits is closed.

4. In a loom having a plurality of shifting shuttle boxes and shuttles each of which may become active, each shuttle being provided with an electric circuit closing element, an electrically operated controller device, a plurality of electric circuits each of which may be connected to the controller device, a detector for each circuit, each of the detectors being effective to establish contact with the element in the active shuttle when said element is uncovered, and means moving in timed relation with the shuttle boxes and dependent for its position upon which shuttle box is in active position, said means when moved in timed relation with the shuttle boxes disconnecting all the said detectors from the controller device except one.

5. In a loom having a plurality of shifting shuttle boxes and shuttles each of which may become active, a member movable in timed relation with the active shuttle box and dependent for its position upon which box is in active position, a plurality of spaced contacts carried by said member, a plurality of detectors, means to initiate a change in the loom, each detector being electrically connected to one of the contacts carried by said member and also to said means to initiate a change in the loom, said member disconnecting all but one of said detectors from the means to initiate a change in the loom as said member moves in timed relation with the shuttle box.

6. In a loom having shifting shuttle boxes and a plurality of shuttles for the boxes carrying yarns of different characteristics, a detector for each character of yarn, the number of detectors being dependent upon the number of different characters of yarn and the number of detectors being independent of the number of shuttles or shuttle boxes, and means acting in timed relation with the shuttle boxes to render operative the detector corresponding to the active shuttle.

7. In a loom having shifting shuttle boxes and a plurality of shuttles carrying yarns of different characteristics, a detector for each character of yarn, the number of detectors being dependent upon the number of different characters of yarn but independent of the number of shuttles and shuttle boxes, means acting in timed relation with the shuttle boxes to render operative the detector corresponding to the active shuttle and to render inoperative the detectors corresponding to the inactive shuttles.

8. In a loom having shifting shuttle boxes and a plurality of shuttles carrying yarns of different characteristics, a detector for each character of yarn, the number of detectors dependent upon the number of different characters of yarn and being independent of the number of shuttle boxes and shuttles, and means acting in timed relation with the shuttle boxes to render operative the detector corresponding to the yarn being laid by the active shuttle.

In testimony whereof I have hereunto affixed my signature.

WALTER H. WAKEFIELD.